(12) United States Patent
Camp, Jr. et al.

(10) Patent No.: US 8,374,254 B2
(45) Date of Patent: Feb. 12, 2013

(54) MULTIMEDIA STREAM COMBINING

(75) Inventors: William O. Camp, Jr., Chapel Hill, NC (US); Mark Gavin Kokes, Raleigh, NC (US); Maurice Labiche, Cary, NC (US); Yojak Harshad Vasa, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 1093 days.

(21) Appl. No.: 12/334,978

(22) Filed: Dec. 15, 2008

(65) Prior Publication Data

US 2010/0150252 A1    Jun. 17, 2010

(51) Int. Cl.
*H04N 7/12* (2006.01)
(52) U.S. Cl. ........... 375/240.27; 375/240.26; 375/240.1; 382/232
(58) Field of Classification Search ............. 375/240.27, 375/240.1; 382/232
See application file for complete search history.

(56) References Cited

U.S. PATENT DOCUMENTS

| | | | |
|---|---|---|---|
| 6,674,911 B1* | 1/2004 | Pearlman et al. | 382/240 |
| 7,006,568 B1* | 2/2006 | Gu et al. | 375/240.11 |
| 7,117,423 B2* | 10/2006 | Kim et al. | 714/774 |
| 2004/0086041 A1 | 5/2004 | Ye et al. | |
| 2004/0105505 A1* | 6/2004 | Kitamura | 375/259 |
| 2007/0291855 A1* | 12/2007 | Reznic et al. | 375/240.27 |
| 2012/0087407 A1* | 4/2012 | Reznic et al. | 375/240.2 |

FOREIGN PATENT DOCUMENTS

| | | |
|---|---|---|
| EP | 1615441 A1 | 1/2006 |
| WO | 2008089938 A2 | 7/2008 |

OTHER PUBLICATIONS

International Search Report mailed Sep. 22, 2009 re: International Application No. PCT/US2009/037061 filed Mar. 13, 2009.

* cited by examiner

*Primary Examiner* — Jay Patel
*Assistant Examiner* — Jessica Prince
(74) *Attorney, Agent, or Firm* — Coats & Bennett, P.L.L.C.

(57) ABSTRACT

Two or more video streams including a high quality video stream and a low quality video stream are simultaneously transmitted to the video receiving device over the wireless network. All of the video streams carry the same video content but with different video quality. The high quality video stream is encoded using an unequal error protection code so that first components (e.g., high frequency components) receive a higher level of error protection than second components (e.g., low frequency components). The video receiving device can select the high quality video stream when channel conditions are favorable. When channel conditions are not good enough to support the high quality video stream, the video receiving device determines whether the first components of the high quality video stream with the greater error protection are usable. If so, the video receiving device combines the first components of the high quality video stream with the low quality video stream. Otherwise, the video receiving device outputs the low quality video stream.

21 Claims, 10 Drawing Sheets

MULTIMEDIA STREAM COMBINING

BACKGROUND

The present invention relates generally to methods and apparatus for video distribution in a wireless communication system and, more particularly, to methods and apparatus for coding video for transmission over wireless networks to mitigate fast fading effects.

Mobile communication devices, such as cellular telephones and personal digital assistants, are now capable of high-speed data communications. Users of mobile communication devices can now surf the web, send and receive email messages, chat with friends, view images, play music, and perform other tasks that previously required a computer. With increasing data rates and bandwidths, along with larger displays, it is now possible to stream high quality video content from a video server to users for viewing on their mobile communication devices.

Selective fading can present a problem when delivering video content over wireless networks. Mobile communication devices may experience rapid changes in channel conditions, particularly in indoor environments. If channel conditions degrade, it may not be possible to support the data rates necessary to deliver high quality video content. In such instances, the video output to the display may be corrupted, or possibly even interrupted, resulting in an unfavorable user experience. Link adaptation responsive to changing channel conditions could be used to mitigate the effects of fading. However, link adaptation requires feedback from the receiving device to the transmitting device. Further, link adaptation may be more useful in slow fading conditions than in fast fading conditions due to the lag between the time that the receiving device reports channel conditions and the time that the modulation and coding can be adapted.

Accordingly, there is a need for new methods to mitigate the effects of fast fading when delivering video to mobile communication devices over wireless networks.

SUMMARY

The present invention provides a method and apparatus for delivering video content to video receiving devices over wireless networks. According to the present invention, two or more video streams carrying the same content but of different quality are simultaneously transmitted to the video receiving device over the wireless network. Preferably, one stream is a high quality video stream and one stream is a low quality video stream. The high quality video stream is encoded using an unequal error protection code so that first components (e.g., high frequency components) receive a higher level of error protections than second components (e.g., low frequency components. The video receiving device can select the high quality video stream when channel conditions are favorable. When channel conditions are not good enough to support the high quality video stream, the video receiving device determines whether the first components of the high quality video stream with the greater error protection are usable. If so, the video receiving combines the first components of the high quality video stream with the low quality video stream. Otherwise, the video receiving device outputs the low quality video stream.

Exemplary embodiments of the invention comprise a multistream video transmission method. One embodiment of the video transmission method comprises receiving selected video content from a video source; generating a high quality and a low quality video stream containing the selected video content; encoding said high quality video stream using an unequal error protection code so that first components in the high quality video stream receive greater error protection than second components; encoding the low quality video stream so that the error protection of the low quality video stream is greater than the error protection of the low frequency components of the high quality video stream; and simultaneously transmitting the encoded low quality and high quality video streams to a video receiving system.

In some embodiments of the multistream video transmission method, encoding said high quality video stream using an unequal error protection code comprises encoding high frequency components of said high quality video stream with greater error protection than low frequency components of said high quality video stream.

In some embodiments of the multistream video transmission method, encoding said high quality video stream using an unequal error protection code comprises encoding said high quality video to provide unequal error protection to spatially distinct components of said high quality video stream.

In some embodiments of the multistream video transmission method, encoding said high quality video stream using an unequal error protection code comprises encoding said high quality video to provide unequal error protection to distinct portions of said high quality video stream based on importance.

Other embodiments of the invention comprise a multistream video transmission system for transmitting selected video content to a remote communication device. One embodiment of the multistream video transmission system comprises a coding circuit configured to generate a high quality video stream from the selected video content and to encode the high quality video stream with an unequal error protection code so that first components in the high quality video stream receive greater error protection than second components; generate a low quality video stream from the selected video content and to encode the low quality video stream to provide greater error protection than the second components of the high quality video stream; a transmitter for transmitting the encoded high quality and low quality video streams to a video receiving system.

In some embodiments of the video transmission system, said first coding circuit is configured to encode high frequency components of said high quality video stream with greater error protection than low frequency components of said high quality video stream.

In some embodiments of the video transmission system, said first coding circuit is configured to encode spatially distinct components of said high quality video stream with different levels of error protection.

In some embodiments of the video transmission system, said first coding circuit is configured to encode distinct portions of said high quality video stream with different levels of error protection based on importance.

Other embodiments of the invention comprise a method implemented at a receiving device of multistream video combining. One embodiment of said method comprises receiving a high quality video stream corresponding to selected video content, said high quality video stream being protected with an unequal error protection code so that first components in the high quality video stream have greater error protection than second components; receiving a low quality video stream corresponding to the selected video content, said low quality video stream being protected with an error protection code so that the low quality video stream has greater error protection than the second components of the high quality video stream; generating first and second quality metrics for said first and second components of said high quality video stream respectively; selecting one of said high quality video stream, said low quality video stream, and an intermediate quality video stream for output based on said quality metrics; and decoding and combining said first and second components of said high quality video stream to regenerate said high quality video stream for output when said quality metrics meet a first predetermined condition; decoding and combining said first components of said high quality video stream and said low quality video signal to generate an intermediate quality video signal for output when said quality metrics meet a second predetermined condition; decoding said low quality video stream for output when said quality metrics do not meet said first and second conditions.

In some embodiments of the multistream video combining method, the first components of the high quality video stream comprise high frequency components and wherein the second components of the high quality video stream comprise low frequency components.

In some embodiments of the multistream video combining method, first and second components of the high quality video steam comprise spatially distinct portions of the high quality video stream.

In some embodiments of the multistream video combining method, first and second components of the high quality video steam comprise portions of relatively high and relatively low importance respectively.

In some embodiments of the multistream video combining method, decoding and combining said first and second components of said high quality video stream to regenerate said high quality video stream for output said quality metrics meet a first predetermined condition comprises comparing said second quality metric to a first predetermined threshold; and decoding and combining said first and second components of said high quality video stream when said second quality metric is less than said first predetermined threshold.

In some embodiments of the multistream video combining method, decoding and combining said first components of said high quality video stream and said low quality video signal to generate an intermediate quality video signal for output when said quality metrics meet a second predetermined condition comprises comparing said first quality metric to a second predetermined threshold; and decoding said low quality video stream first components of said high quality video stream and said low quality video stream when said first quality metric is less than said second predetermined threshold.

In some embodiments of the multistream video combining method, decoding said low quality video stream for output when said quality metrics do not meet said first and second conditions comprises decoding said low quality video stream when said first quality metric is less than first predetermined threshold and said second quality metric is less than said second predetermined threshold.

Other embodiments of the invention comprise a communication device for receiving and combing a multistream video. In one embodiment, the communication device comprises a receiver to receive high quality and low quality video streams corresponding to selected video content from a video transmission device, said high quality video stream being protected with an unequal error protection code so that first components in the high quality video stream have greater error protection than second components, and said low quality video stream being protected with an error protection code so that the low quality video stream has greater error protection than the second components of the high quality video stream; a control unit to select one of a high quality video stream, low quality video stream, and intermediate quality video stream for output based on first and second quality metrics associated with said first and second components respectively of said high quality video stream; a decoding circuit responsive to said control unit and configured to decode and combine said first and second components of said high quality video stream to regenerate said high quality video stream for output when said quality metrics meet a first predetermined condition, decode and combine said first components of said high quality video stream and said low quality video signal to generate an intermediate quality video signal for output when said quality metrics meet a second predetermined condition, and decode said low quality video stream for output when said quality metrics do not meet said first and second conditions.

In some embodiments of the communication device, the first components of the high quality video stream comprise high frequency components and wherein the second components of the high quality video stream comprise low frequency components.

In some embodiments of the communication device, the first and second components of the high quality video stream comprise spatially distinct portions of the high quality video stream.

In some embodiments of the communication device, the first and second components of the high quality video stream comprise portions of relatively high and relatively low importance respectively.

In some embodiments of the communication device, the control unit is configured to select the high quality video stream for output when the first channel quality metric meets a first predetermined condition and to select one of said low quality and intermediate quality video streams for output when the first channel quality metric does not meet said first predetermined condition.

In some embodiments of the communication device, the control unit is configured to select said intermediate quality video stream for output when the second quality metric meets said second predetermined condition and to select said low quality video stream for output when said second quality metric does not meet said second predetermined condition.

DETAILED DESCRIPTION

Figure 1:
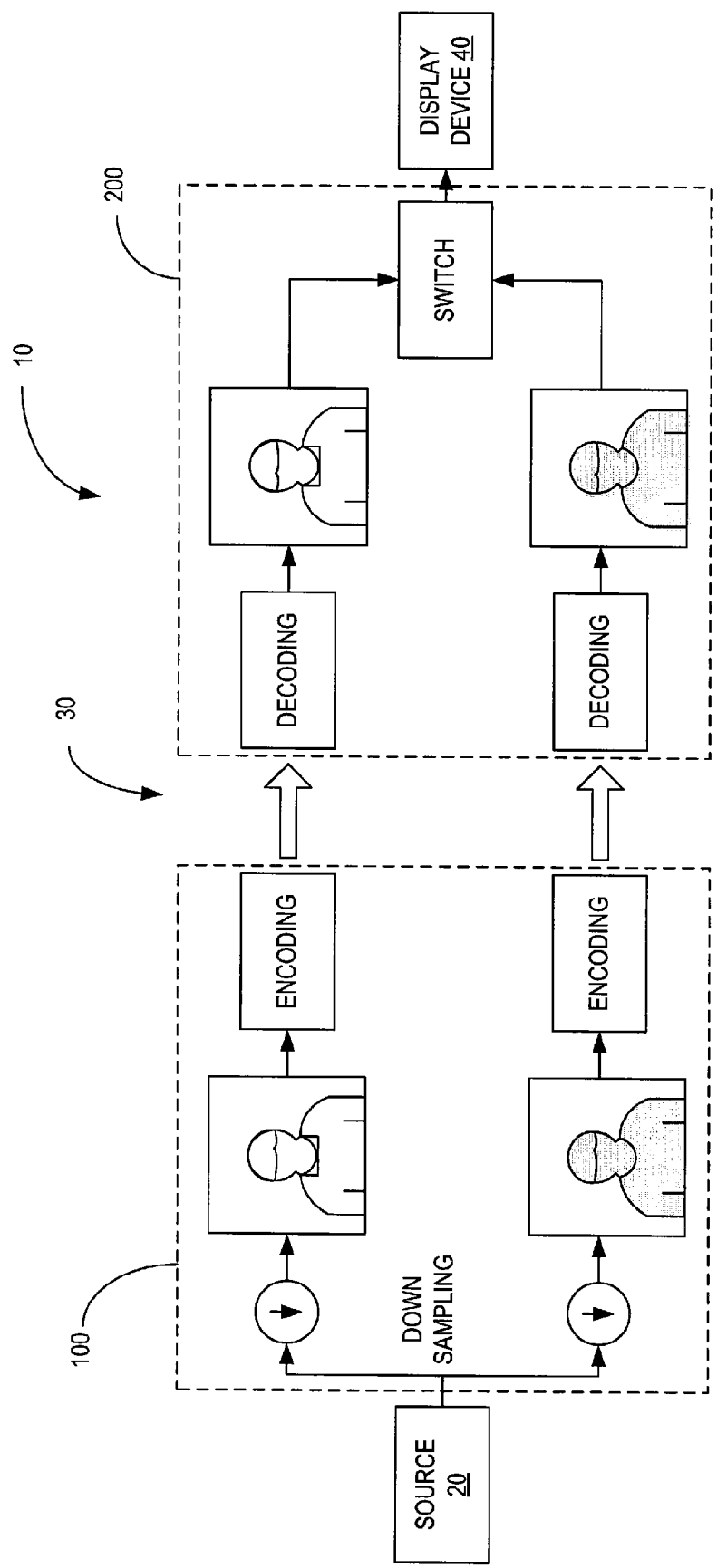
FIG. 1 illustrates the main functional elements of a video distribution system according to one exemplary embodiment of the present invention for transmitting two or more video streams with the same video content but of varying video quality.

The present invention relates to a method of transmitting real-time multimedia streams, such as video streams, to a mobile terminal over a mobile communication network. The mobile terminal may comprise, for example, a cellular telephone, personal digital assistant, a computer, or other communication device. In a mobile communication network, the mobile terminal may encounter rapidly changing channel conditions due to selective fading. Video streams are typically transmitted to a mobile terminal with sufficient power margin to ensure a desired error performance under all expected channel conditions. However, if the power margin is too low, the mobile terminal may experience periods when the channel conditions will not support the data rates required to properly receive and decode the video stream. In such circumstances, the video stream may be corrupted or lost.

One way to avoid corruption or loss of the transmitted video stream is to increase the power headroom or margin allocated to the video stream. The power headroom or margin is the difference between the actual transmit power allocated for transmission of the video stream and the average transmit power needed to properly receive and decode the video stream. Increasing the power margin provides greater protection against corruption and loss of the video stream at the cost of reduced spectral efficiency.

According to the present invention, a portion of the power normally allocated to transmit a high quality (HQ) video stream is used instead to transmit one or more additional low quality (LQ) video streams with the same video content but of lower quality. The LQ video streams can be generated, for example, by reducing the resolution and/or color depth of the HQ video stream. The number of source coded bits in the LQ video streams may represent only 10% of the number of bits in the HQ video stream. Thus, a small reduction in the margin of the HQ video stream can provide sufficient power to transmit the LQ video stream with a high margin. For example, a 2-3 dB reduction in the margin for the HO video stream may enable transmission of a LQ video stream with a 10 dB margin.

The high quality and low quality video streams can be synchronized, and transmitted to the mobile terminal over a mobile communication network. The video streams can be independently coded and transmitted over separate channels (e.g., time slots or codes) to the mobile terminal. The mobile terminal can then select the highest quality video stream for output to the display that is supported by the instantaneous channel conditions. When channel conditions are good, the mobile terminal can select the HQ video stream. As channel conditions deteriorate, the mobile terminal can switch to a LQ video stream. By switching to a LQ video stream, interruption of the video can be avoided. Because the video streams are coded independently, the mobile terminal can use the LQ video stream even when the high quality video stream itself is unusable.

FIG. 1 illustrates the main functional components of a video distribution system 10 according to one exemplary embodiment of the present invention. The video distribution system 10 comprises a video transmission system 100 and a video receiving system 200. The video transmission system 100 may, for example, comprise a base station in a mobile communication network and the video receiving system 200 may comprise a mobile communication device, such as a cellular phone or personal digital assistant. The video transmission system 100 receives video content from a video source 20, generates multiple encoded source video streams with the same video content but of varying quality, and transmits the multiple encoded video streams over a wireless communication channel 30 to the video receiving system 200. In general, the video transmission system 100 generates at least two video streams: a high quality video stream and one or more low quality video streams. The terms high quality and low quality are not intended to imply a particular quality level, but instead are relative terms to indicate the relative quality of the video streams. Typically, there is a significant difference in the quality of each video stream.

The video receiving system 200 receives and decodes the video streams, generates one or more channel quality metrics indicative of the quality of each channel as seen by the video receiving system 200, and selects the highest quality video stream that is supported by the instantaneous channel conditions. Frame error rate (FER) is one example of a channel quality metric. The bit error rate (BER) could also be used as a channel quality metric. The selected video stream is output to a display device 40 for viewing by a user. When channel conditions are favorable and can support high data rates, the video receiving system 200 will select the high quality video stream for output to the display device 40. As channel conditions degrade, the video receiving system 200 will select one of the low quality video streams. By selecting a low quality video stream when channel conditions are not favorable, interruption of the video program may be avoided.

Figure 2:
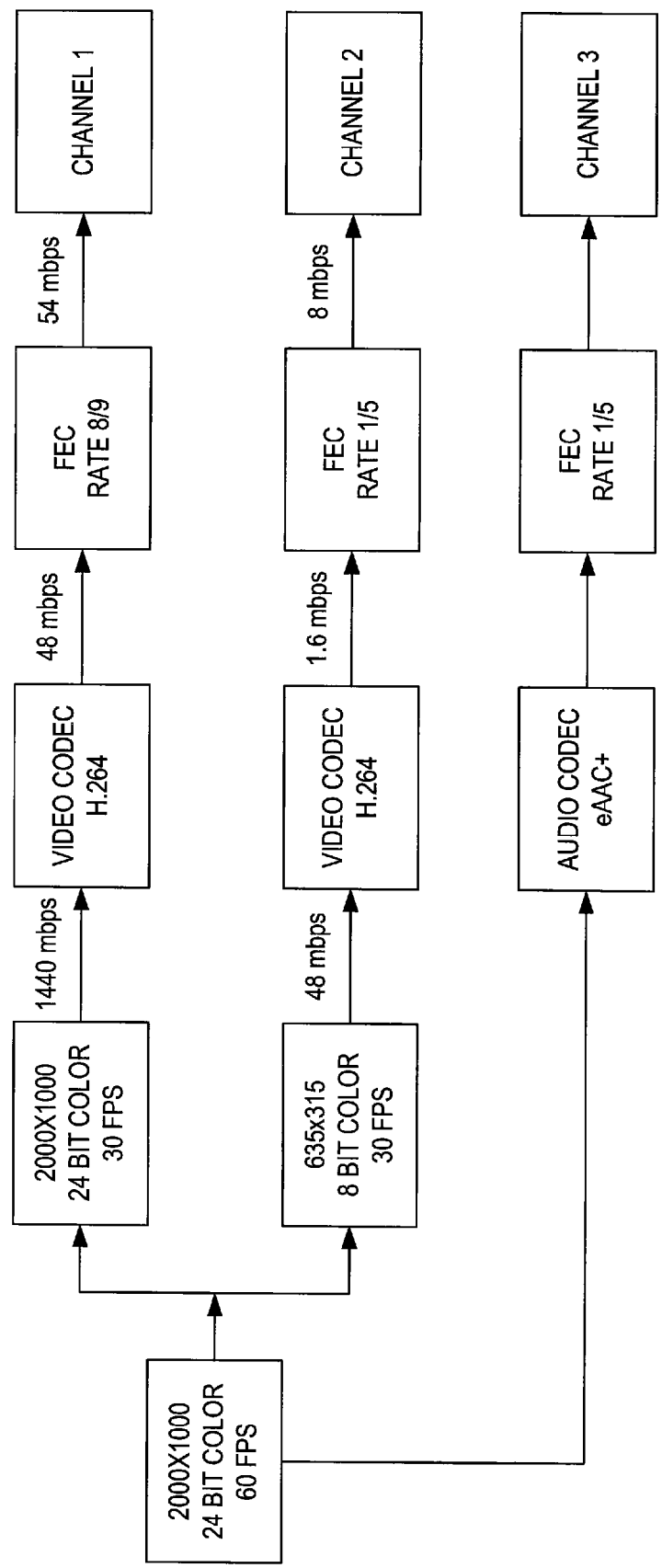
FIG. 2 illustrates the coding of two video streams with the same video content but of varying quality according to one exemplary embodiment of the invention.

FIG. 2 illustrates the source and channel coding applied in one exemplary embodiment. The original video file comprises 60 frames per second (fps). Each frame is 2000×1000 pixels with 24 bit color. In this example, two video streams are generated from the same video content. The video streams are referred to herein as the high quality (HQ) video stream and the low quality (LQ) video stream. The designations HQ and LQ do not imply a particular quality level, but instead, are meant to indicate the relative quality of the two streams. Those skilled in the art will appreciate that the coding Bode illustrated in FIG. 2 is only one example of the coding that may be applied and, therefore, the example is not intended to limit the invention.

The HQ video stream comprises 30 fps. Each frame is 2000×1000 pixels with 24 bit color. The resulting data rate for the HQ video stream is 1440 mbps. The HQ video stream is coded using an H.264 video codec. The output from the video codec is a 48 mbps video stream. Following source coding, the HQ video stream is protected with a rate 8/9 FEC code. The output from the FEC coder is a 54 mbps video stream.

The LQ video stream is created by downsampling the frames of the original video file to reduce the horizontal resolution, vertical resolution, and/or color depth of the video frames. In this exemplary embodiment, the LQ video stream comprises 30 fps. Each frame is 635×315 pixels with 8 bit color depth. The resulting data rate for the LQ video stream is 48 mbps. The LQ video stream is coded using an H.264 video codec to generate a 1.6 mbps video stream. Following source coding, the LQ video stream is protected with a rate ⅕ FEC code. The output from the FEC coder is a 8 mbps video stream.

The audio stream is preferably encoded with a standard audio codec, such as the eAAC+ audio codec. The coded audio stream is then protected by a rate ⅕ FEC code.

Figure 3:
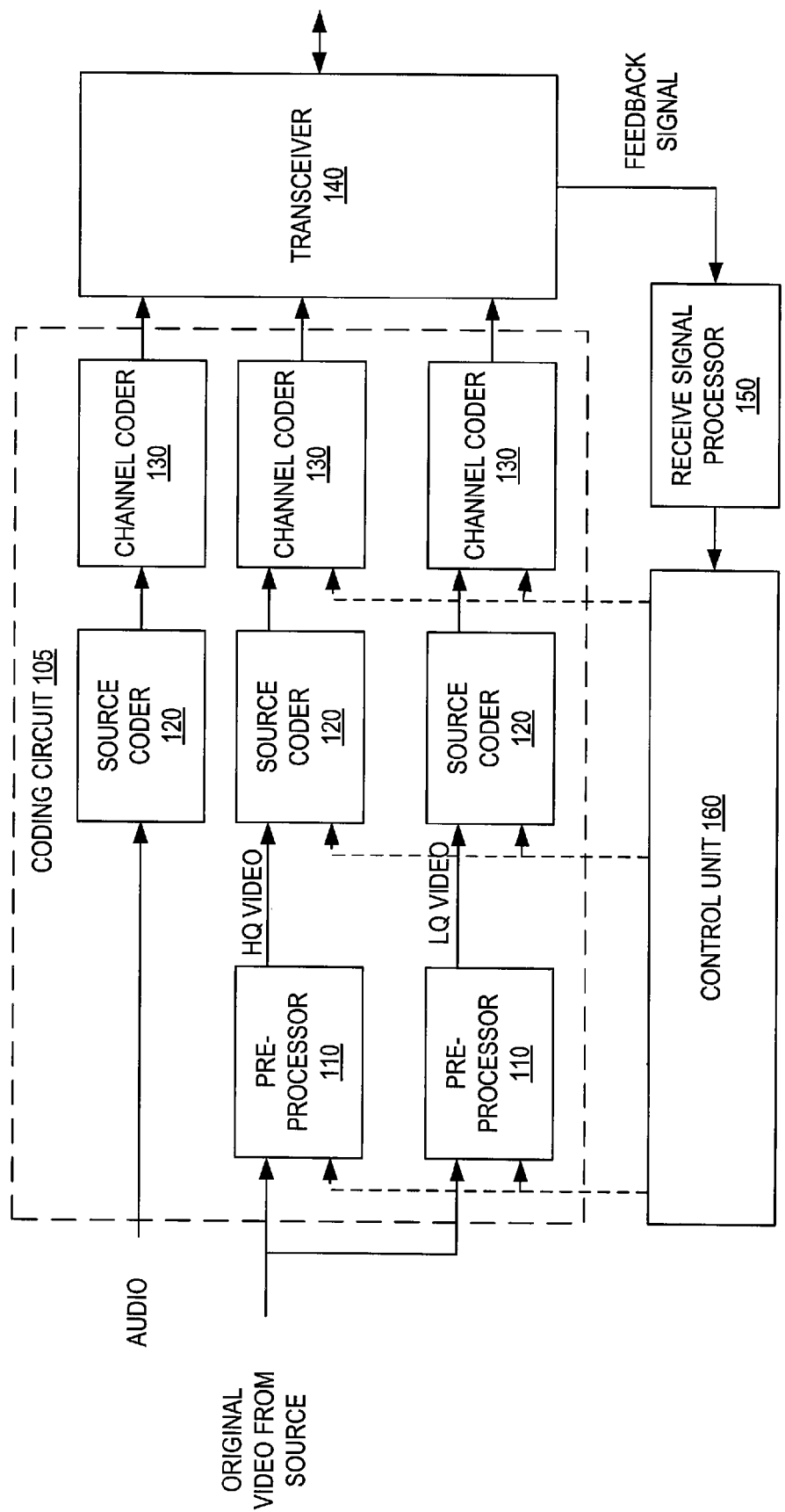
FIG. 3 illustrates a video transmission system according to one exemplary embodiment of the invention for transmitting two or more video streams with the same video content but of varying video quality.

FIG. 3 illustrates an exemplary video transmission system (i.e., base station) 100 according to one exemplary embodiment. The video transmission system 100 includes a coding circuit 105 for coding video content to generate multiple encoded video streams, a transceiver circuit 140 for transmitting the video streams to the video receiving system 200, a receive signal processor 150 for processing feedback signals from the video receiving system 200, and a control unit 160 for controlling operation of the video transmission system 100. As will be described in greater detail below, the control unit 160 may adapt the source and channel coding for each of the video streams based on feedback received from the video receiving system 200.

Figure 4:
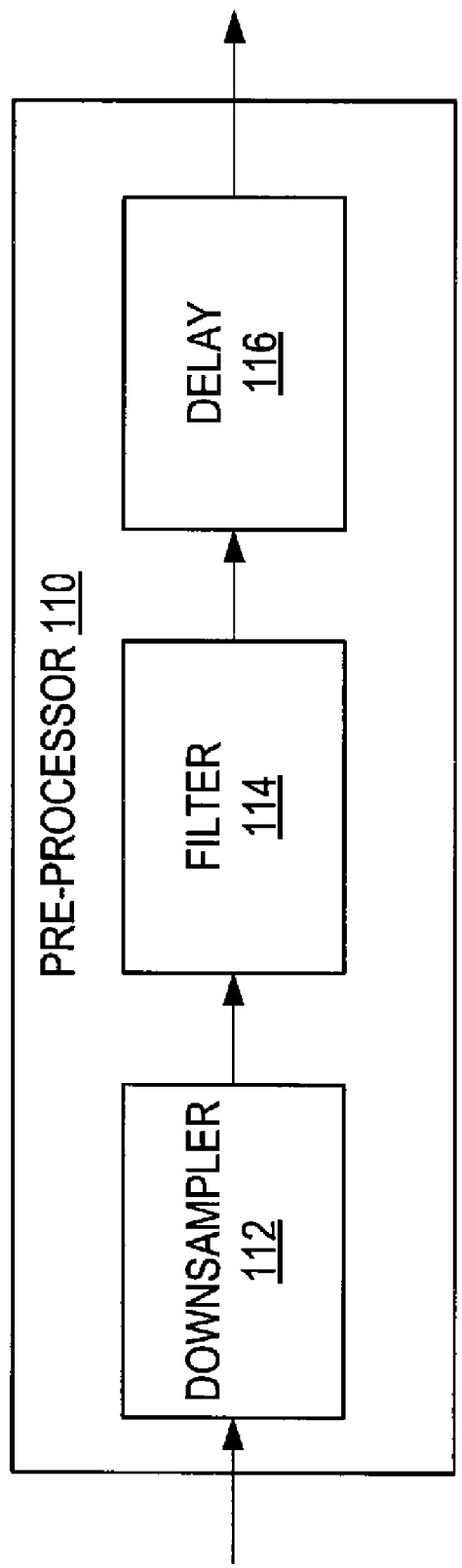
FIG. 4 illustrates the main functional elements in a pre-processor for the video transmission system.

The coding circuit 105 includes a pre-processor 110, source coder 120, and channel coder 130 for each video stream. The coding circuit 105 also includes a source coder 120 and channel coder 130 for the associated audio stream. The pre-processor 110, shown in FIG. 4, includes a down-sampler 112 to down-sample the video content to provide multiple video streams of a predetermined quality. The video stream is filtered by a filter 114 and time aligned with other video streams by a delay element 116. The time aligned sample streams from all pre-processors 110 are then input to respective source coders 120. The source coders 120 are preferably standard codecs, such as H.264 codecs for the video streams and eAAC codecs for the audio stream. Those skilled in the art will appreciate, however, that the present invention may use other video and audio codecs now known or later developed.

After source coding, the source-coded video streams and audio stream are input to respective channel coders 130. The channel coders 130 encode the video and audio streams with forward error correction (FEC) codes to protect against bit errors that may occur during transmission. The FEC codes may comprise, for example, convolutional codes or block codes. Preferably, a low code rate (e.g., ⅕) is used for the low quality stream to provide a relatively high level of error protection and a higher code rate e.g. (⅚) is used for the high quality stream to provide a relatively low level of error protection. A low code rate is also used for the audio stream.

The channel-encoded video streams and audio stream are then modulated and transmitted over separate channels to the video receiving system 200. The same modulation may be applied to each video stream and audio stream. Alternatively, different modulation schemes for the different video streams and audio stream. The transceiver 140 transmits the modulated symbols corresponding to each video stream and audio stream over separate communication channels (e.g., time slots or codes) to the video receiving system 200. The transceiver 140 may, for example, comprise a cellular transceiver operating according to known standards, such as the WCDMA and LTE standards. The HQ video stream is transmitted with a relatively low margin compared to the LQ video stream, and the LQ video stream is transmitted with a relatively high margin compared to the HQ video stream. For example, the high quality video stream may have a 1 dB margin. The increase in channel capacity required for 1 dB of additional margin of the HQ video stream can provide approximately 8 dB of margin for the LQ video stream. This provides 7 dB of additional margin for delivery of the video content, albeit with lower quality in some channel conditions, than using the channel capacity to increase the margin and/or protection of the HQ video stream. The increased margin may be obtained for example by providing greater error protection to the low quality video stream as compared to the high quality video stream. Ways of increasing the margin include increasing the transmit power and increasing the number of channel bits used to deliver a given number of data bits in the form of increased error correction bits or increased redundancy bits.

As will be described in more detail below, the video receiving system 200 for receiving multiple video streams of varying quality may send feedback signals to the video transmission system 100 to indicate the channel quality of the received video streams at the video receiving system 200. For example, the feedback signals may include the FER, BER, or other quality signal metrics for the received video streams. The feedback signals are processed by a receive signal processor 150 and supplied to the control unit 160. The control unit 160 may use the channel quality metrics fed back from the video receiving unit 200 to adjust the quality of the video streams. For example, the control unit 160 may change the resolution of the video streams by varying the sampling rates used by the downsamples 112. The control unit 150 may also vary the source and/or channel coding applied to the video streams responsive to changes in the quality metrics.

Figure 5:
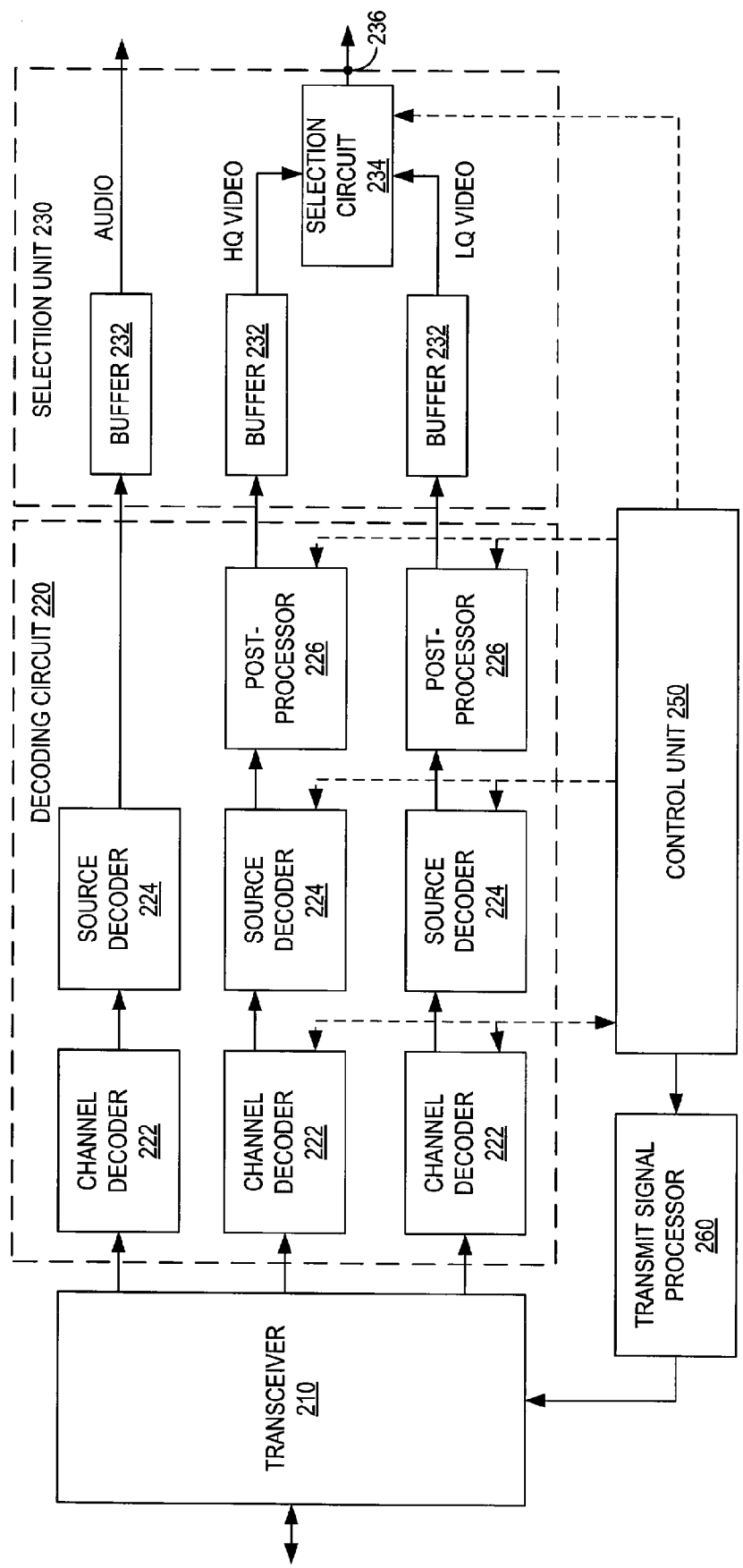
FIG. 5 illustrates an exemplary video receiving system according to one exemplary embodiment of the invention for receiving two or more video streams with the same video content but of varying video quality.

FIG. 5 illustrates an exemplary video receiving system 200. The video receiving system 200 comprises a transceiver 210 to receive the encoded video and audio streams over a mobile communications network, a decoding circuit 220 to decode the video and audio streams, a selection unit 230 to select one of the video streams for output to the display device 40, a transmit signal processor 260 to process feedback signals transmitted to the video transmission system 100, and a control unit 250 for controlling the video receiving system 200. The transceiver 210 may comprise, for example, a fully functional cellular transceiver operating according to any standard now known or later developed, such as the WCDMA standard or LTE standard. The encoded video and audio signals output from the transceiver 210 are supplied to the decoding circuit 220.

The decoding circuit 220 independently decodes each video stream and audio stream. The decoding circuit 220 includes a channel decoder 222 and source decoder 224 for each video stream and audio stream. The decoding circuit 220 also includes a post-processor 226 for each video stream. The channel decoders 222 detect and correct errors that may have occurred during transmission. The channel decoders 222 for the video streams may also generate channel quality metrics (e.g., FER, BER, etc.) indicative of the received channel quality of the received video streams. The source coder 224 decompress the video streams and audio signals output from the channel decoders 222 to generate video and audio signals suitable for output to the display devices 40. The decoded video streams may be further processed by post-processors 226. For example, the post-processors 226 may perform interpolation to scale the video frames so that the frames from both the HQ and LQ video streams appear the same size to the user.

The decoded video and audio signals are input to a selection unit 230. The selection unit 230 includes a buffer 232 for each video and audio stream and a selection switch 234 to connect a selected one of the video buffers to a video output 236 of the selection unit 230. The control unit 250 receives the channel quality metrics from channel decoders 222 and controls the selection switch 234 to output a selected one of the video streams for playback on the display device 40. In general, the control unit 250 will select the highest quality video stream that is supported by the instantaneous channel conditions. If channel conditions are favorable, the control unit 250 will select the highest quality video stream for output to the display device 240. As channel conditions degrade, the FER/BER of the HQ video stream will increase. When the FER/BER reaches a predetermined threshold, the control unit 250 will select a LQ video stream to prevent interruption in the playback of the video content. When channel conditions improve again, the control unit 250 will switch back to the HQ video stream. Because the video streams are independently encoded, the HQ video stream is not needed to decode and play the LQ video stream. Therefore, the LQ video stream can be played even when the HQ video stream is unusable.

As noted above, the quality metrics used by the control unit 250 to select a video stream for playback and may be fed back to the video transmission system 100 to adapt the video quality of the transmitted video streams. The transmit signal processor 260 processes the feedback signals for transmission to the video receiving system 100 over an uplink control channel.

Figure 6:
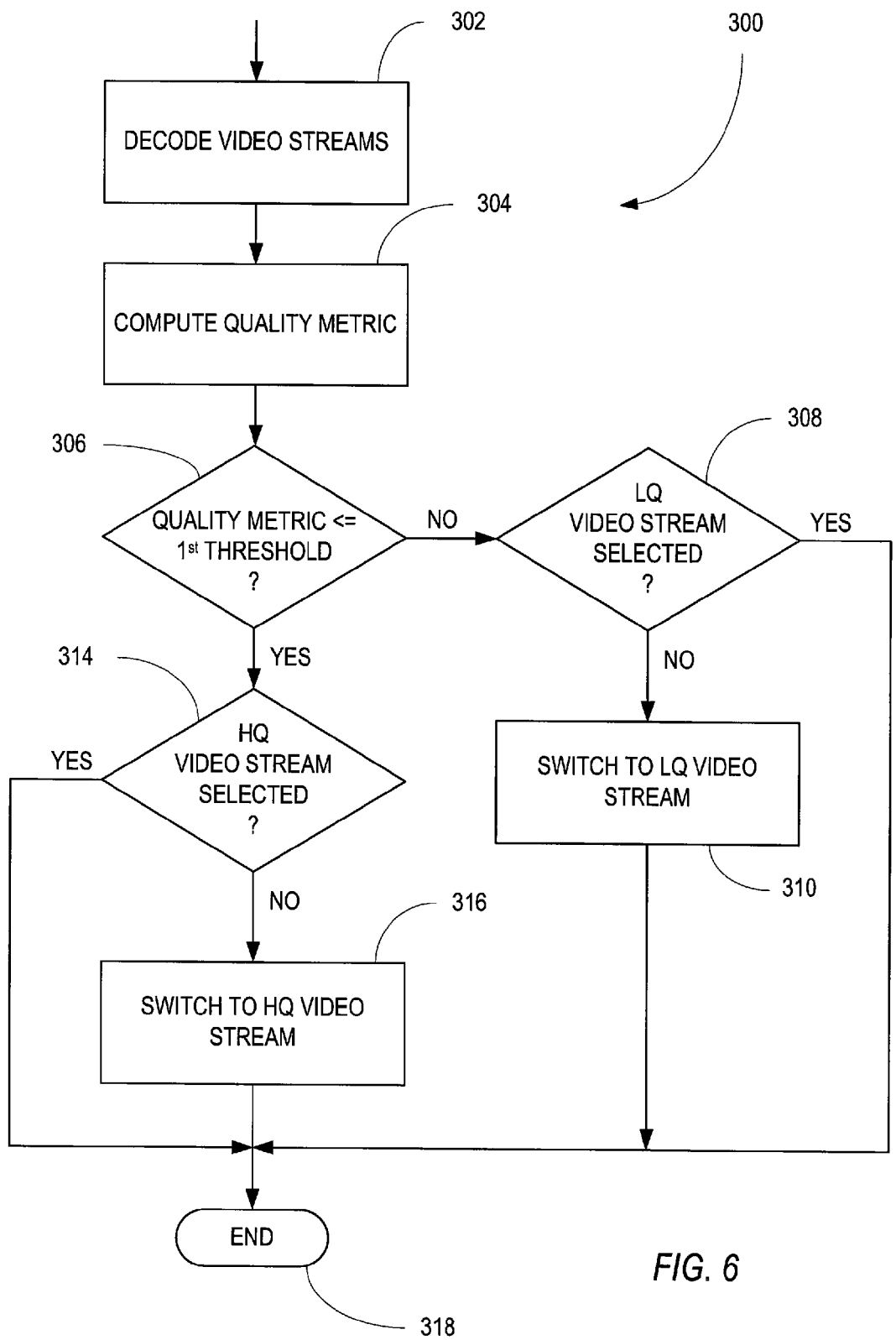
FIG. 6 illustrates an exemplary method implemented by a video receiving system for autonomously switching between two or more video streams with the same video content but of varying quality.

As previously indicated, both the HQ video stream and the LQ video stream are transmitted from the video transmission system 100 to the video receiving system 200. The video receiving system 200 preferably decodes both video streams and sends the decoded video streams to respective buffers 232. The decoder channel decoders 222 at the video receiving system 200 generate channel quality metrics for at least the HQ video stream and provides the channel quality metrics to the control unit 250. The quality metrics may, for example, comprise the FERs or BERs of the respective video streams after decoding. In some embodiments, the decoders 222 may provide the FER, BER, or other channel quality metric for both video streams. The control unit 250 selects one of the video streams for output based on the quality metrics FIG. 6 illustrates an exemplary method 300 implemented by the video receiving system 200 for selecting a video stream for output. The video receiving system 200 decodes one or more of the video streams (block 302). It is assumed in this example that two video streams are received from the video transmission system: a HQ video stream and a LQ video stream. The channel decoders 222 at the video receiving system generate channel quality metrics for at least the HQ video stream (block 304). The quality metric may, for example, comprise the FER/BER of the HQ video stream. The control unit 250 compares the FER/BER of the HQ video stream to a first predetermined threshold (block 306). It may be noted that the quality metric in this example is an error rate and that the threshold is therefore an upper limit on the FER or BER. As channel conditions worsen, the FER and/or BER will increase. Therefore, the threshold can be set based on the maximum amount of errors that can be tolerated. If the FER/BER exceeds the first predetermined threshold, the control unit 250 determines whether the LQ stream is currently selected (block 308). If the LQ stream is not currently selected, the control unit 250 generates a control signal to switch the output to the LQ video stream (block 310). If the LQ stream is selected, the procedure ends (block 318) and the video receiving system 200 continues to output the LQ video stream. If the FER/BER is less than the first predetermined threshold, the control unit 250 determines whether the HQ stream is currently selected (block 314). If the HQ stream is not currently selected, the control unit 250 generates a control signal to switch the output to the HQ video stream (block 316). If the HQ stream is selected the procedure ends (block 318) and the video receiving system 200 continues to output the HQ video stream.

In one exemplary embodiment of the present invention, decoding the LQ video stream is not required all of the time. If the channel quality of the HQ video stream is sufficient, processing resources can be conserved by disabling or turning off the channel decoder 222 and source decoder 224 for the LQ video stream. As the quality of the HQ video stream deteriorates, decoding for the LQ video stream can be enabled. Preferably, decoding of the LQ video stream is enabled before switching the LQ video stream so that the buffer 232 for the LQ video stream has time to fill. A second predetermined threshold lower than the first predetermined threshold can be used to enable and disable decoding for the LQ video stream. When the channel quality of the HQ video stream exceeds the second predetermined threshold, the control unit 250 can enable decoding for the LQ video stream. When the channel quality of the HQ video stream remains below the second predetermined threshold for a specified period of time, decoding for the LQ stream can be disabled.

Figure 7:
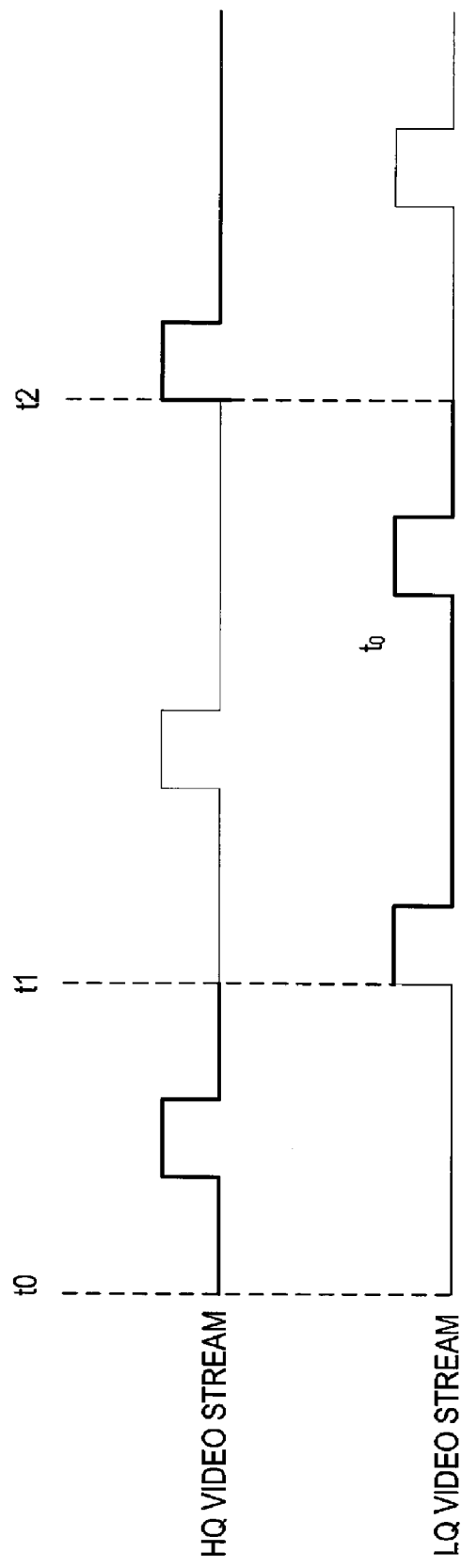
FIG. 7 is a timing diagram that illustrates switch timing in one exemplary embodiment of the invention for switching between two or more video streams with the same video content but of varying quality.

In order to switch smoothly between the HQ and LQ video streams, the control unit 250 can control the switch timing of the selection circuit 230 so that the transition from one video stream to another is coincident with the occurrence of an I-frame in the video stream being selected. FIG. 7 is a timing diagram illustrating the switch timing in one exemplary embodiment of the invention. The timing of the I-frames, shown as pulses, in the HQ and LQ video streams is preferably synchronized so that the time relationship between I-frames in the HQ and LQ streams respectively is known to the control unit 250. As shown in FIG. 7, the HQ stream is selected at time $t_0$. The channel quality of the HQ stream subsequently degrades and the control unit 250 switches to the LQ video stream at time $t_1$, which is coincident with an I-frame in the LQ stream. When the channel quality of the HQ stream improves, the control unit 250 switches back to the HQ video stream at time $t_2$, which is coincident with an I-frame in the HQ video stream.

In one exemplary embodiment, the video transmission system 100 can adapt the quality of the high quality, the low quality video stream, or both based on feedback received from the video receiving system 200 to prevent waste of resources and to provide a better viewing experience for the user. When the video receiving system 200 dwells for a long time on the LQ video stream, the video transmission system 200 can adjust the video quality of one or more of the video streams downward. Conversely, when video receiving system 200 dwells for a long period of time on the high quality video stream, the video quality of one or more of the video streams can be adjusted upward.

Reducing the video quality can be accomplished in a number of different ways. One way to reduce the video quality of a video stream is to reduce the horizontal resolution, vertical resolution, or color depth of the frames in the video stream. Another method of reducing the video quality is to change the compression ratio used by the source coder 120 at the video transmission system 100. Each of these approaches reduces the number of source coded bits that are transmitted to the video receiving system 200. When the data rate of the source coded video stream is reduced, there is also a corresponding reduction in the signal-to-noise ratio required to receive the video stream with a targeted error rate. The reduction in the number of source bits also increases the power margin of the transmitted video streams. The additional margin gained by reducing the number of source coded bits can be used by increasing the redundancy (i.e., lowering the code rate) applied by the channel coder 130 to increase the error protection. Alternatively, the additional margin can be used by increasing the transmit data rate of the channel coded bits or increasing the transmit power.

Co-pending U.S. patent application titled "Multimedia Stream Selection" being filed concurrently with this application describes one exemplary method and apparatus for adjusting the quality of the video streams and is incorporated herein in its entirety by reference.

Although the examples of the invention described assume that two streams are transmitted from the video transmission system to the video receiving system 200, those skilled in the art will appreciate that one or more additional intermediate quality video streams could also be transmitted. In this case, the video receiving system 200 can be configured to select the highest quality video stream that is supported by the current channel conditions. However, each transmitted video stream consumes additional bandwidth, which could be used for other purposes.

According to one exemplary embodiment of the invention, one or more intermediate quality video streams can be generated at the video receiving system 200 by using an unequal error protection code for the high quality video stream and combining the usable portions of the high quality video stream with the low quality video stream when channel conditions are not sufficient to support the high quality video stream. In this embodiment, the high frequency components of the high quality video stream receive greater error protection than the low frequency components of the high quality video stream. Applying greater error protection to the high frequency components is counter-intuitive. Normally, unequal error protection schemes provide greater error protection for the low frequency components in a video stream. The present invention does the opposite since the second low quality video stream contains the low frequency components of the video. When the channel conditions are such that the high quality video stream is not supported, the high frequency components of the high quality video stream may still be usable. In this case, the video receiving system 200 combines the high frequency components of the high quality video stream with the low quality video stream to create an intermediate quality video stream for output to the display device 40.

Figure 8:
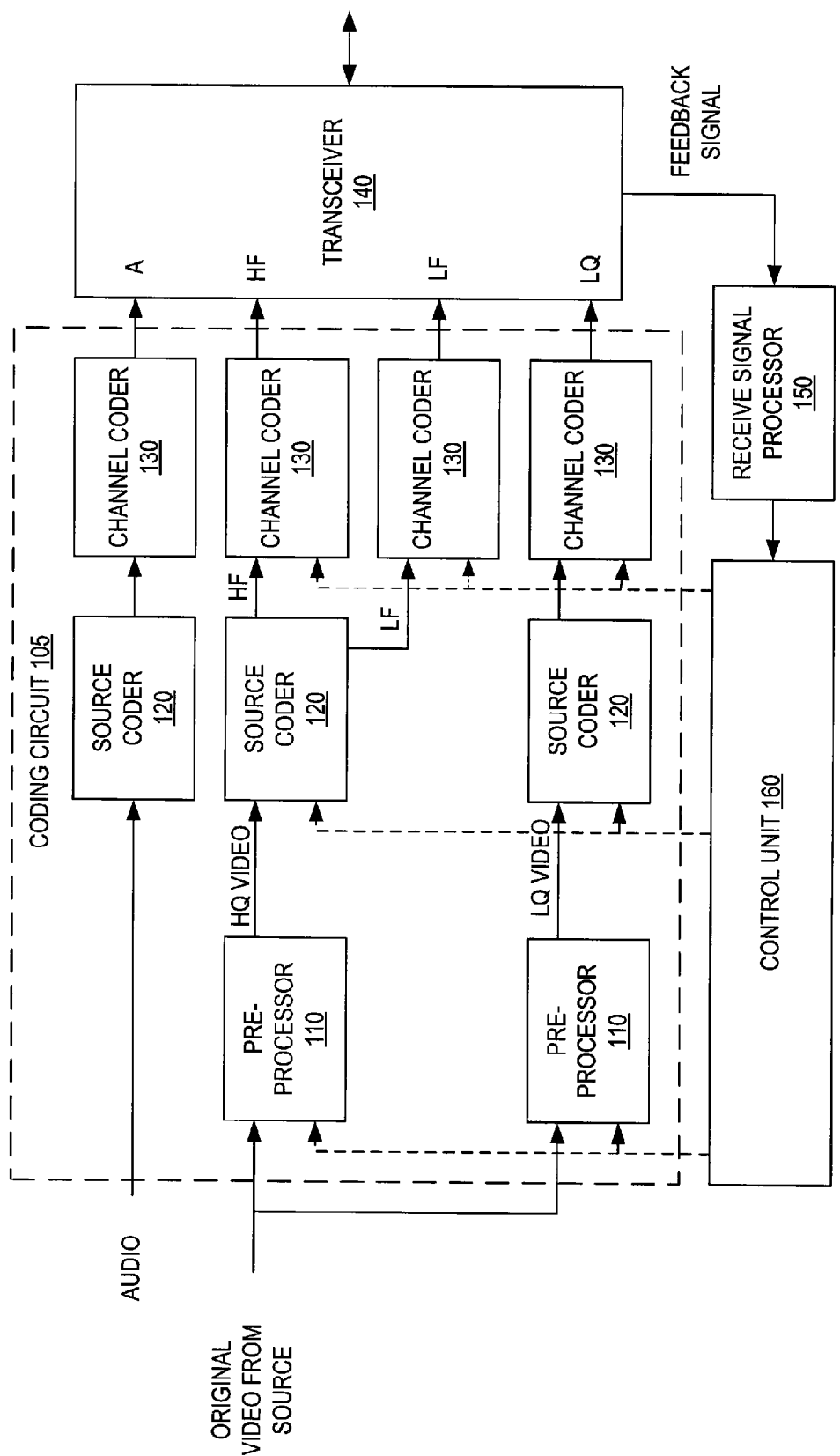
FIG. 8 illustrates an exemplary multistream video transmission system according to one exemplary embodiment of the invention implementing an unequal error protection.

FIG. 8 illustrates an exemplary video transmission system 100 for applying unequal error protection to the HQ video stream as described above. The video transmission system 100 illustrated in FIG. 8 is substantially the same as the video transmission system 100 illustrated in FIG. 3. Therefore, the same reference numbers are used in FIG. 8 to indicate corresponding components. The video transmission system 100 comprises a coding circuit 105, transceiver 140, receive signal processor 150, and control unit 160. The coding circuit 105 includes a pre-processor 110 for each video stream and a source coder 120 for each video and audio stream. The source coder 120 may use sub-band coding for the HQ video stream to separately encode the high frequency components and the low frequency components of the HQ video stream. The source coder 120 for the HQ video stream outputs the high frequency components and low frequency components as two separate streams. The source coder 120 for the LQ video stream and the audio stream may be the same as previously described. The coding circuit 105 further includes a plurality of channel coders 130; one for each video and audio stream output by the source coders 120. Thus, this embodiment essentially divides the HQ video stream into two separate streams; a high frequency stream and a low frequency stream. The channel coder 130 for the high frequency stream applies a greater level of error protection to the high frequency stream than the channel coder 130 for the low frequency stream.

Three video stream and one audio stream are then output to the transceiver for transmission. The remaining components of the video transmission system 100, including the transceiver 140, receive signal processor 150, and control unit 130, are the same as previously described.

Figure 9:
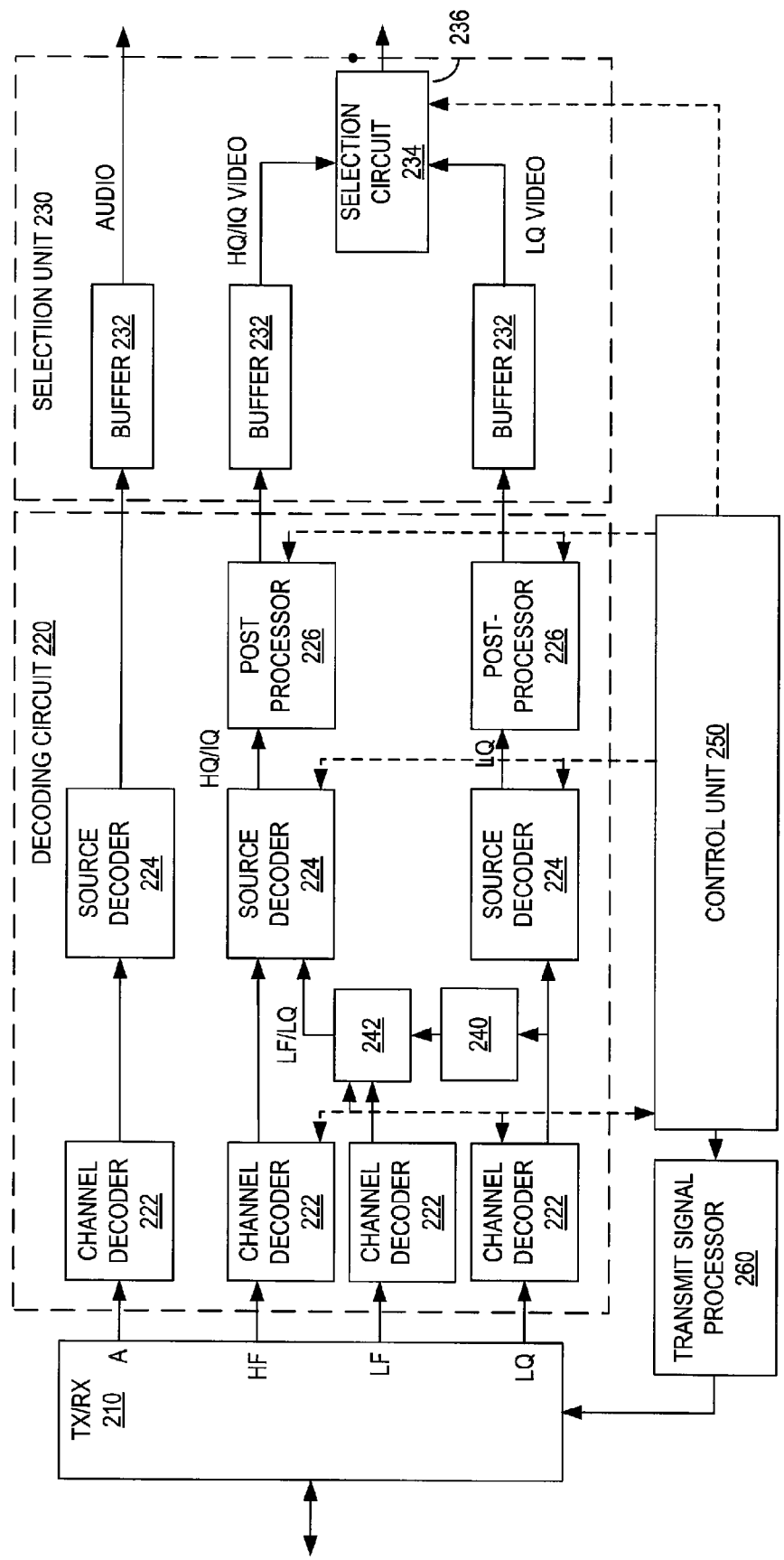
FIG. 9 illustrates an exemplary multistream video receiving system according to one exemplary embodiment of the invention implementing an unequal error protection.

FIG. 9 illustrates an exemplary video receiving system 200 configured to selectively combine the HQ and LQ video streams to generate an intermediate quality video stream. The video transmission system 200 shown in FIG. 9 is similar to the video transmission system 100 shown in FIG. 5. Accordingly, the same reference numbers have been used to indicate corresponding components. The video receiving system 200 comprises a transceiver 210, decoding circuit 220, selection unit 230, control units 250, and transmit signal processor 260. The decoding circuit 220 includes channel decoders 222 and source decoders 224 for each video and audio stream. The decoding circuit 220 further includes a post-processor 226 for each video stream. The channel decoders 222 for the audio stream and LQ video stream may be the same as previously described. The decoding circuit 222, in contrast to the previous embodiment, includes separate channel encoders for the high frequency (HF) and low frequency (LF) components of the HQ video stream. As previously noted, the HF components of the HQ video stream have greater error protection than the LF components. The channel decoders 222 for the HF and LF components may provide separate quality metrics to the control unit 250, which are used to select a video stream for output.

The source decoder 224 for the LQ video stream and the audio stream may be the same as previously described. The source decoder 224 for the HQ video stream receives two inputs. The first input is from the channel decoder 222 for the HF components of the HQ video stream. The second input is from the output of switch 242, which is connected between the channel decoders 222 for the LF components of the HQ video stream and the LQ video stream. The switch 242 has one input connected to the output of the channel decoder 222 for the LF components of the HQ video stream. A second input is connected to a resolution processor 240. The resolution processor 240 processes the LQ video stream to match the resolution of the LQ video stream with the resolution of the HQ video stream. The enhanced LQ video stream is then input to the switch 242.

The control unit 250 is configured to select between the HO video stream, LQ video stream, and an intermediate quality (IQ) video stream. The selection decision is based on quality metrics for at least the LF components of the HQ video stream. Because the LF components receive less error protection, the control unit 250 could assume that the HF components will have acceptable quality to be used. However, the control unit 250 could also take into account the quality metric of the HF component as well in making a decision to use the HQ video stream.

When channel conditions are favorable, the control unit 250 controls switch 242 to output the LF components to the source decoder 224 for the Ho video stream. The source decoder 224 then combines the HF and LF components to regenerate the HQ video stream and outputs the HQ video stream. The control unit 250 also controls the selection circuit 234 to output the HQ video stream. When the channel conditions do not support the HQ video stream, the control unit 250 determines whether to output the LQ video stream or IQ video stream based on the quality metrics for the HF and LF components of the HQ video stream. If the HF component of the HQ video stream is usable, the control unit 250 controls the switch 242 to output the enhanced LQ video stream to the source coder 224. In this case, the source coder 224 for the HQ video stream combines the HF components of the HQ video stream with the enhanced LQ video stream to generate an IQ video stream and outputs the IQ video stream. The control unit 250 also controls the selection circuit 234 to output the HQ video stream. If the HF components are not usable, the control unit 250 controls the selection circuit 234 to output the LQ video stream.

Figure 10:
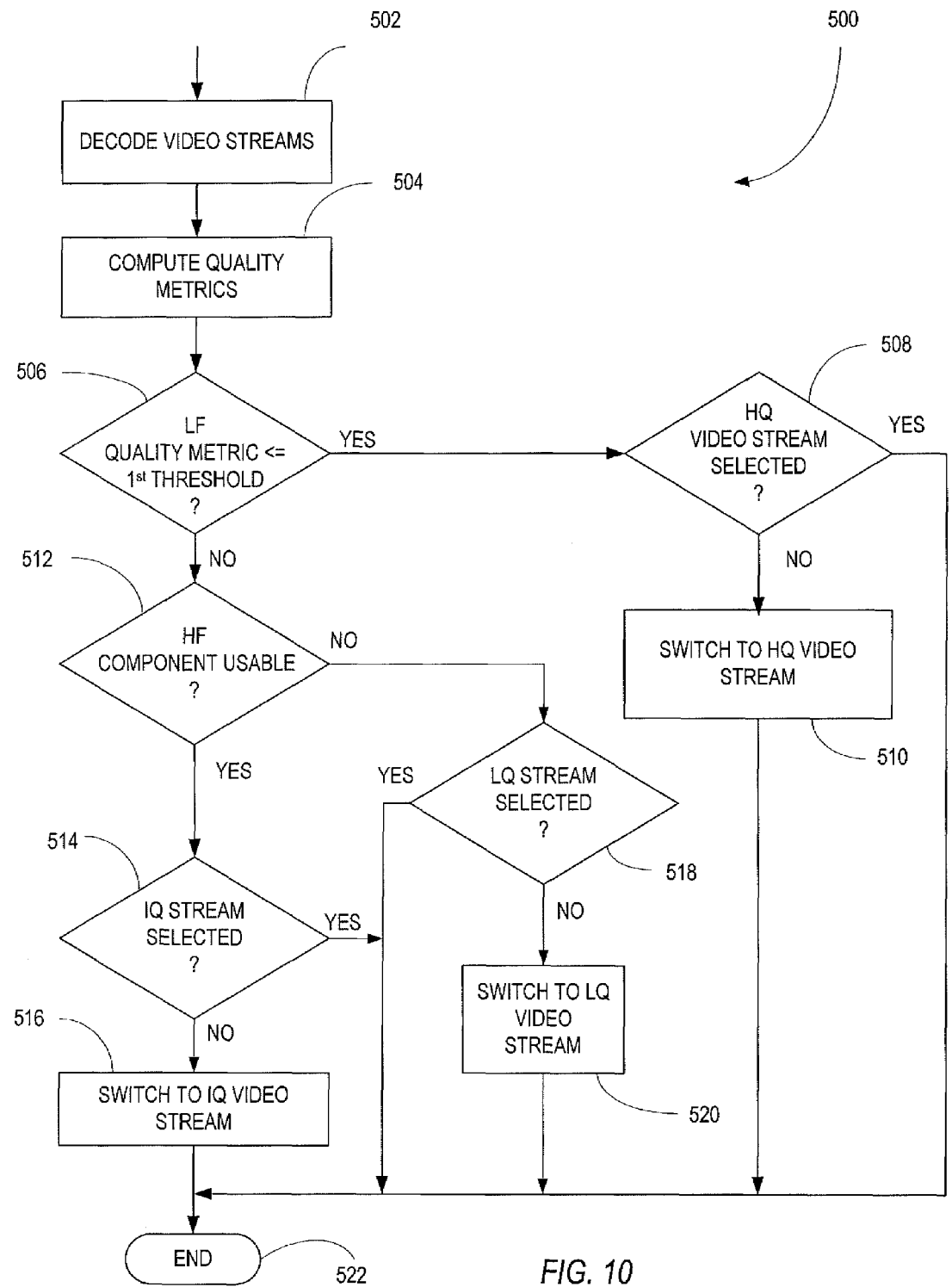
FIG. 10 illustrates an exemplary method implemented by a multistream video receiving system implementing unequal error protection.

FIG. 10 illustrates an exemplary method 500 for selecting between a HQ video stream, LQ video stream, or IQ video stream according to one exemplary embodiment. The video receiving system 200 decodes one or more of the video streams (block 502). It is assumed in this example that two video streams are received from the video transmission system: a HQ video stream and a LQ video stream. The channel decoders 222 at the video receiving system 200 generate channel quality metrics for at least the LF components of the HQ video stream (block 504). The quality metric may, for example, comprise the FER/BER of the video stream. The control unit 250 compares the FER/BER of the LF component to a first predetermined threshold as previously described (block 506). It may be noted that the quality metric in this example is an error rate and that the threshold is therefore an upper limit on the FER or BER. As channel conditions worsen, the FER and/or BER will increase. Therefore, the threshold can be set based on the maximum amount of errors that can be tolerated. If the FER/BER exceed-s is less than the first predetermined threshold, the control unit 250 determines whether the HQ stream is currently selected (block 508). If the LQ stream is currently selected, the control unit 250 generates a control signal to cause the selection circuit 230 to output the HQ video stream (block 510). If the HQ stream is selected, the procedure ends (block 522) and the selection circuit 234 continues to output the HQ video stream.

Returning to block 506, if the FER/BER is greater than the first predetermined threshold, the control unit 250 determines whether the HF components in the HQ stream are usable based on the quality metric for the HF components (block 512). If the HF components are usable, an intermediate quality stream is selected. The control unit 250 determines whether the IQ stream is already selected (block 514). If not, the control unit 250 switches to the IQ video stream (block 516). If the HF components are not usable, the LQ video stream is selected. The control unit 250 determines whether the LQ stream is currently selected (block 518), and generates a control signal to cause the selection unit 230 to output the LQ video stream (block 520).

In the system described above, the different frequency components of the HQ video stream receive different levels of error protection. In some embodiments of the invention, the same technique can be used to apply different levels of error protection to spatially distinct components of the HQ video stream. For example, the center portion of the HQ video stream can be provided with a greater level of error protection than the edge portion of the HQ video stream. The center portion can then be combined with the LQ stream if needed to generate the intermediate quality video stream. More generally, the HQ video stream could be divided into portions of relatively high and relatively low importance. The portions having high importance may receive greater error protection then the portions with lower importance. As one example, object recognition technology could be used to identify foreground objects. The foreground objects may be given greater error protection than background objects. The portions with relatively high importance can then be combined with the LQ stream if needed to generate the intermediate quality video stream.

The present invention may, of course, be carried out in other specific ways than those herein set forth without departing from the scope and the essential characteristics of the invention The present embodiments are therefore to be construed in all aspects as illustrative and not restrictive and all changes coming within the meaning and equivalency range of the appended claims are intended to be embraced therein.

What is claimed is:

1. A multistream video transmission method comprising:
   receiving selected video content from a video source;
   generating a high quality and a low quality video stream containing the selected video content;
   encoding said high quality video stream using an unequal error protection code so that first components in the high quality video stream receive greater error protection than second components;
   encoding the low quality video stream so that the error protection of the low quality video stream is greater than the error protection of the second components of the high quality video stream; and
   simultaneously transmitting the encoded low quality and high quality video streams to a video receiving system.

2. The multistream video transmission method of claim 1 wherein encoding said high quality video stream using an unequal error protection code comprises encoding high frequency components of said high quality video stream with greater error protection than low frequency components of said high quality video stream.

3. The multistream video transmission method of claim 1 wherein encoding said high quality video stream using an unequal error protection code comprises encoding said high quality video to provide unequal error protection to spatially distinct components of said high quality video stream.

4. The multistream video transmission method of claim 1 wherein encoding said high quality video stream using an unequal error protection code comprises encoding said high quality video to provide unequal error protection to distinct portions of said high quality video stream based on importance.

5. A multistream video transmission system for transmitting selected video content comprising:
   a coding circuit configured to:
      generate a high quality video stream from the selected video content and to encode the high quality video stream with an unequal error protection code so that first components in the high quality video stream receive greater error protection than second components;
      generate a low quality video stream from the selected video content and to encode the low quality video stream to provide greater error protection than the second components of the high quality video stream;
   a transmitter for transmitting the encoded high quality and low quality video streams to a video receiving system.

6. The multistream video transmission system of claim 5 wherein said coding circuit is configured to encode high frequency components of said high quality video stream with greater error protection than low frequency components of said high quality video stream.

7. The multistream video transmission system of claim 5 wherein said coding circuit is configured to encode spatially distinct components of said high quality video stream with different levels of error protection.

8. The multistream video transmission system of claim 5 wherein said coding circuit is configured to encode distinct portions of said high quality video stream with different levels of error protection based on importance.

9. A method of multistream video combining, said method comprising:
   receiving a high quality video stream corresponding to selected video content, said high quality video stream being protected with an unequal error protection code so that first components in the high quality video stream have greater error protection than second components;
   receiving a low quality video stream corresponding to the selected video content, said low quality video stream being protected with an error protection code so that the low quality video stream has greater error protection than the second components of the high quality video stream;
   generating first and second quality metrics for said first and second components of said high quality video stream respectively;
   selecting one of said high quality video stream, said low quality video stream, and an intermediate quality video stream for output based on said quality metrics; and
   decoding and combining said first and second components of said high quality video stream to regenerate said high quality video stream for output when said quality metrics meet a first predetermined condition;
   decoding and combining said first components of said high quality video stream and said low quality video signal to generate an intermediate quality video signal for output when said quality metrics meet a second predetermined condition;
   decoding said low quality video stream for output when said quality metrics do not meet said first and second conditions.

10. The method of claim 9 wherein the first components of the high quality video stream comprise high frequency components and wherein the second components of the high quality video stream comprise low frequency components.

11. The method of claim 9 wherein the first and second components of the high quality video steam comprise spatially distinct portions of the high quality video stream.

12. The method of claim 9 wherein the first and second components of the high quality video steam comprise portions of relatively high and relatively low importance respectively.

13. The method of claim 9 wherein decoding and combining said first and second components of said high quality video stream to regenerate said high quality video stream for output said quality metrics meet a first predetermined condition:
   comparing said second quality metric to a first predetermined threshold; and
   decoding and combining said first and second components of said high quality video stream when said second quality metric is less than said first predetermined threshold.

14. The method of claim 13 wherein decoding and combining said first components of said high quality video stream and said low quality video signal to generate an intermediate quality video signal for output when said quality metrics meet a second predetermined condition comprises:
   comparing said first quality metric to a second predetermined threshold; and
   decoding said low quality video stream first components of said high quality video stream and said low quality video stream when said first quality metric is less than said second predetermined threshold.

15. The method of claim 14 wherein decoding said low quality video stream for output when said quality metrics do not meet said first and second conditions comprises decoding said low quality video stream when said first quality metric is less than first predetermined threshold and said second quality metric is less than said second predetermined threshold.

16. A communication device for receiving multistream video, said communication device comprising:
   a receiver to receive high quality and low quality video streams corresponding to selected video content from a video transmission device, said high quality video stream being protected with an unequal error protection code so that first components in the high quality video stream have greater error protection than second components, and said low quality video stream being protected with an error protection code so that the low quality video stream has greater error protection than the second components of the high quality video stream;
   a control unit to select one of a high quality video stream, low quality video stream, and intermediate quality video stream for output based on first and second quality metrics associated with said first and second components respectively of said high quality video stream;
   a decoding circuit responsive to said control unit and configured to:
      decode and combine said first and second components of said high quality video stream to regenerate said high quality video stream for output when said quality metrics meet a first predetermined condition;
      decode and combine said first components of said high quality video stream and said low quality video signal to generate an intermediate quality video signal for output when said quality metrics meet a second predetermined condition;
      decode said low quality video stream for output when said quality metrics do not meet said first and second conditions.

17. The communication device of claim 16 wherein the first components of the high quality video stream comprise high frequency components and wherein the second components of the high quality video stream comprise low frequency components.

18. The communication device of claim 16 wherein the first and second components of the high quality video steam comprise spatially distinct portions of the high quality video stream.

19. The communication device of claim 16 wherein the first and second components of the high quality video steam comprise portions of relatively high and relatively low importance respectively.

20. The communication device of claim 16 wherein the control unit is configured to select the high quality video stream for output when the first channel quality metric meets a first predetermined condition and to select one of said low quality and intermediate quality video streams for output when the first channel quality metric does not meet said first predetermined condition.

21. The communication device of claim 20 wherein the control unit is configured to select said intermediate quality video stream for output when the second quality metric meets said second predetermined condition and to select said low quality video stream for output when said second quality metric does not meet said second predetermined condition.

* * * * *